(12) United States Patent  
Chidanand et al.

(10) Patent No.: US 8,964,033 B2  
(45) Date of Patent: Feb. 24, 2015

(54) COST-EFFECTIVE SYSTEM AND METHOD FOR DETECTING, CLASSIFYING AND TRACKING THE PEDESTRIAN USING NEAR INFRARED CAMERA

(75) Inventors: K. S. Chidanand, Kolkata (IN); Brojeshwar Bhowmick, Kolkata (IN)

(73) Assignee: Tata Consultancy Services Limited (IN)

( * ) Notice: Subject to any disclaimer, the term of this patent is extended or adjusted under 35 U.S.C. 154(b) by 278 days.

(21) Appl. No.: 13/380,559

(22) PCT Filed: Dec. 2, 2010

(86) PCT No.: PCT/IN2010/000783  
§ 371 (c)(1),  
(2), (4) Date: May 15, 2012

(87) PCT Pub. No.: WO2011/067790  
PCT Pub. Date: Jun. 9, 2011

(65) Prior Publication Data  
US 2012/0229643 A1    Sep. 13, 2012

(30) Foreign Application Priority Data

Dec. 2, 2009  (IN) .......................... 2785/MUM/2009

(51) Int. Cl.  
*G06K 9/00* (2006.01)  
*G06K 9/48* (2006.01)

(52) U.S. Cl.  
CPC ........ *G06K 9/00369* (2013.01); *G06K 9/00791* (2013.01); *G06K 9/482* (2013.01)  
USPC .................................... 348/148; 348/E7.085

(58) Field of Classification Search  
None  
See application file for complete search history.

(56) References Cited

U.S. PATENT DOCUMENTS

| | | |
|---|---|---|
| 5,694,487 A | 12/1997 | Lee |
| 7,139,411 B2 | 11/2006 | Fujimura et al. |
| 7,421,091 B2 | 9/2008 | Satoh |
| 7,526,102 B2 | 4/2009 | Ozer |

OTHER PUBLICATIONS

Real-Time Pedestrian Detection and Tracking at Nighttime for Driver-Assistance Systems, Ge et al. (Hereinafter referred to as "Ge"), IEEE Transactions on Intelligent Transportation Systems, vol. 10, No. 3, Jun. 2009, p. 283-298.*

(Continued)

*Primary Examiner* — Sath V Perungavoor  
*Assistant Examiner* — Janese Duley  
(74) *Attorney, Agent, or Firm* — Thompson Hine L.L.P.

(57) ABSTRACT

A cost effective method for detecting, classifying and tracking the pedestrian present in front of the vehicle by using images captured by near infrared (IR) camera disposed on the vehicle, the said method comprises the processor implemented steps of: detecting the road to focus of attention for filtering the region of interest (ROI) objects in the said image by estimating the ground region characterized by identifying smooth regions connected to bottom most part of the image; eliminating the non-ground objects based on their distance to ground; filtering the non-ROI objects based on the shape of such objects by computing the signal to noise ratio (SNR) which is a measure of regularity of the component based on its periodicity of its contour for each of such non-ROI objects; eliminating the non-vertical objects by computing inertial moment relative to x and y axis with respect to the centre of mass of such non-vertical objects; classifying the pedestrians in the analyzed frame of the image based their shape; and tracking the movement of the classified pedestrian using mean shift algorithm.

9 Claims, 1 Drawing Sheet

(56) References Cited

OTHER PUBLICATIONS

Pedestrian Detection for a Near Infrared Imaging System, Soga et al, IEEE Conference on Intelligent Transportation System, Beijing, China, Oct. 12-15, 2008.*

A Multi-stage Classifier Based Algorithm of Pedestrian Detection in Night with a Near Infrared Camera in a Moving Car, Sun et. al., Proceedings of the Third International Conference on Image and Graphics, Dec. 2004.*

A Shape-Independent Method of Pedestrian Detection with Far-Infrared Images, Fang et al., IEEE Transactions onVehicular Technology, vol. 53, No. 6, Nov. 2004.*

* cited by examiner

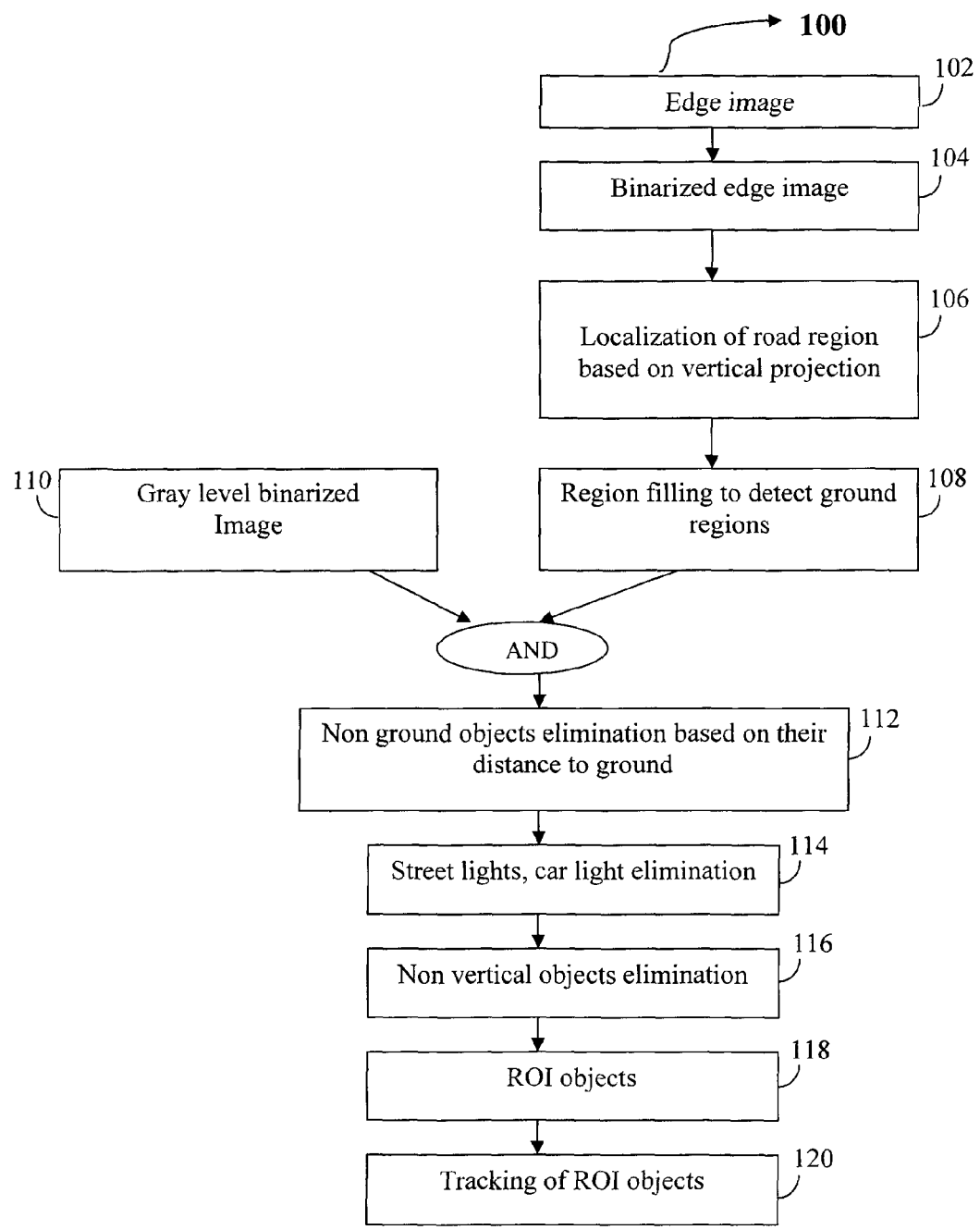

COST-EFFECTIVE SYSTEM AND METHOD FOR DETECTING, CLASSIFYING AND TRACKING THE PEDESTRIAN USING NEAR INFRARED CAMERA

FIELD OF THE INVENTION

The present invention generally relates to a system and method for detecting, classifying and tracking the pedestrian. More particularly, this invention relates to a cost effective system and method for detecting, classifying and tracking the pedestrian present in front of the vehicle by using real time images captured by near infrared (IR) camera disposed on the vehicle.

BACKGROUND OF THE INVENTION

Road accidents involving pedestrians are far more frequent at night than during the day. Worldwide, the number of people killed in road traffic crashes each year is estimated at almost 1.2 million, while the number injured could be as high as 50 million, which is the combined population of five of the world's largest cities. Many of the people killed in such accidents are the pedestrians. The most important factor is the drivers dramatically reduced range of vision. Fewer pedestrians would be killed or seriously injured if vehicles were equipped with improved pedestrian detection systems combined with driver warning strategies.

Some of the inventions which deals with pedestrian detection and tracking known to us are as follows:

U.S. Pat. No. 7,139,411 to Fujimura et al. teaches that a system and method for detecting and tracking as pedestrians, in low visibility conditions or otherwise. A night vision camera periodically captures an infrared image of a road from a single perspective. A pedestrian detection module determines a position of a pedestrian in the frame by processing the captured image. The pedestrian detection module includes a support vector machine to compare information derived from the night vision camera to a training database. A pedestrian tracking module estimates pedestrian movement of the detected pedestrian from in subsequent frames by applying filters. The tracking module uses Kalman filtering to estimate pedestrian movement at periodic times and mean-shifting to adjust the estimation.

U.S. Pat. No. 7,526,102 to Ibrahim Burak Ozer teaches that methods and systems for providing real-time video surveillance of crowded environments. The method consists of several object detection and tracking processes that may be selected automatically to track individual objects or group of objects based on the resolution and occlusion levels in the input videos. Possible objects of interest (OOI) may be human, animals, cars etc. The invention may be used for tracking people in crowded environments or cars in heavy traffic conditions.

U.S. Pat. No. 7,421,091 to Hiroshi Satoh teaches that outputs of pixels present around a given pixel at an image-capturing unit having a plurality of pixels disposed two-dimensionally are added to the output of the given pixel.

U.S. Pat. No. 5,694,487 to Min-Sub Lee teaches a method for determining feature point for each of the blocks based on the gradient magnitude and variance corresponding to each of the pixels therein.

Most of these known devices, systems and methods use complex methods in order to detect and track pedestrian and are costlier. The accuracy of these methods isn't adequate to detect and track the pedestrian.

Thus, in the light of the above mentioned background of the art, it is evident that, there is a need for a system and method for detecting, classifying and tracking the pedestrian present in front of the vehicle for avoiding collision, which is simple, easy to install and provides higher accuracy at a lower cost.

OBJECTIVES OF THE INVENTION

The primary objective of the present invention is to provide a system and method for detecting, classifying and tracking the pedestrian present in front of the vehicle for avoiding collision which is simple, easy to install, provides higher accuracy at a lower cost.

Another objective of the invention is to provide a systematic way of detecting the road region by estimating ground region using near IR camera.

Further objective of the invention is to provide a systematic way of eliminating non-ground objects based on their distance to ground using near IR camera.

Another objective of the invention is to provide a systematic way of filtering the non-ROI objects based on the shape of such objects by computing the signal to noise ratio (SNR) which is a measure of regularity of the component based on its periodicity of its contour for each of such non-ROI objects using near IR camera.

Still another objective of the invention is to provide a systematic way of eliminating the non-vertical objects from the IR images by computing inertial moment relative to x and y axis with respect to the centre of mass of such non-vertical objects.

Yet another objective of the invention is to provide a systematic way of classifying the pedestrians in the analyzed frame of the image based their shape using near IR camera.

Further objective of the invention is to provide a systematic way of tracking the movement of the classified pedestrian using mean shift algorithm.

Yet another objective of the invention is to provide a system and method for detecting and tracking the pedestrians which is simple and cost effective.

SUMMARY OF THE INVENTION

Before the method, system, and hardware enablement of the present invention are described, it is to be understood that this invention in not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present invention provides a system and method for system and method for detecting, classifying and tracking the pedestrian present in front of the vehicle while driving for avoiding collision which is simple, easy to install, provides higher accuracy at a lower cost.

The present invention embodies a cost effective method for detecting, classifying and tracking the pedestrian present in front of the vehicle using images captured by near infrared (IR) camera disposed on the vehicle, wherein the said method comprises the processor implemented steps of: detecting the road to focus attention and for filtering the region of interest (ROI) objects in the said image by estimating the ground region characterized by identifying smooth regions connected to bottom most part of the image; eliminating the non-ground objects based on their distance to ground; filtering the non-ROI objects based on the shape of such objects by computing the signal to noise ratio (SNR) which is a measure of regularity of the component based on its periodicity of its contour for each of such non-ROI objects; eliminating the non-vertical objects by computing inertial moment relative to x and y axis with respect to the centre of mass of such non-vertical objects; classifying the pedestrians in the analyzed frame of the image based their shape; and tracking the movement of the classified pedestrian using mean shift algorithm.

In one aspect of the invention tracked data with respect to the pedestrian is further communicated by the processor to an output means.

In yet another aspect of the invention an alert means warns the driver for presence of one or more pedestrian, wherein the alert means can be audio and audio visual devices, sounding an alarm, a voice based caution, an Indicator and display.

In accordance with another aspect of the invention, near IR camera can be disposed either on the dashboard or in front or inside or top of the vehicle. In one exemplary embodiment of the invention, the near IR camera can be disposed in front of the vehicle.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and apparatus disclosed in the drawings:

FIG. 1 is a flowchart which illustrates a method for detecting, classifying and tracking the pedestrian present in front of the vehicle while driving for avoiding collision according to various embodiments of the invention.

DETAIL DESCRIPTION OF THE INVENTION

Some embodiments of this invention, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. The disclosed embodiments are merely exemplary of the invention, which may be embodied in various forms by a person skilled in the art.

A cost effective method for detecting, classifying and tracking the pedestrian present in front of the vehicle by using images captured by near infrared (IR) camera disposed on the vehicle, the said method comprising the processor implemented steps of:
 a) detecting the road to focus of attention for filtering the region of interest (ROI) objects in the said image by estimating the ground region characterized by identifying smooth regions connected to bottom most part of the image;
 b) eliminating the non-ground objects based on their distance to ground;
 c) filtering the non-ROI objects based on the shape of such objects by computing the signal to noise ratio (SNR) which is a measure of regularity of the component based on its periodicity of its contour for each of such non-ROI objects;
 d) eliminating the non-vertical objects by computing inertial moment relative to x and y axis with respect to the centre of mass of such non-vertical objects;
 e) classifying the pedestrians in the analyzed frame of the image based their shape; and
 f) tracking the movement of the classified pedestrian using mean shift algorithm.

The present invention provides a system and method for detecting, classifying and tracking the pedestrian present in front of the vehicle while driving for avoiding collision which is simple, easy to install, provides higher accuracy at a lower cost.

According to one exemplary embodiment of the invention, a cost effective system comprises of a near IR camera disposed on the vehicle for capturing an image; and a processor for analyzing the captured image in real-time for detecting, classifying and tracking the pedestrian present in front of the vehicle.

FIG. 1 is a flowchart which illustrates a method 100 for detecting, classifying and tracking the pedestrian present in front of the vehicle while driving for avoiding collision according to various embodiments of the invention.

In one embodiment of the invention, a cost effective method 100 for detecting, classifying and tracking the pedestrian present in front of the vehicle by using images captured by near infrared (IR) camera disposed on the vehicle. In accordance with another aspect of the invention, near IR camera can be disposed either on the dashboard or in front or inside or top of the vehicle. In one example embodiment of the invention, the near IR camera is disposed in front of the vehicle.

In accordance with one aspect of the invention the resolution of the near IR camera can be selected from 640*480, 720*480, etc. In an exemplary embodiment of the invention, the resolution of the near IR camera is 720*480. In accordance with one aspect of the invention the IR range of the near IR camera can be selected from a range of (0.7-1) to 5 Microns for detecting and tracking the pedestrians. In an exemplary embodiment of the invention, the IR range of the near IR camera can be selected from a range of 0.7 to 5 Microns. In accordance with one aspect of the invention the temperature range of the near IR camera can be selected from 740 to 3,000-5,200 Kelvin for detecting and tracking the pedestrians.

In accordance with one aspect of the invention the processor can be disposed either in the body of the near IR camera or on the dashboard of the vehicle. In one exemplary embodiment of the invention, the processor is disposed either in the body of the near IR camera. In accordance with another aspect of the invention the processor can be selected from the group of Davinci DM6446 Processor, ADSP-BF533, 750 MHz Blackfin Processor.

The above said cost effective method comprises various processor implemented steps. In the case of object detection with an on-board near IR camera, first ground region needs to be estimated. In the first step of the proposed method, the processor detects the road to focus attention for filtering the region of interest (ROI) objects in the said image by estimating the ground region. In order to detect ground region, the processor executes the following steps:

Initially, Image differentiation 102 is done using sobel operator, then threshold the differentiated image 104 is determined using Otsu algorithm. According to one aspect of the invention, threshold parameters for differentiated images can be varied based on the applicability. In the thresholded of the differentiated binary image, at each bottom most pixel along width of the image, traverse upwards until there is 0-1 transition. The region 106 from bottom most pixel to 0-1 transition indicates smooth regions which indicates road. Such regions are marked with values as 'X'. This procedure is repeated for each bottom most pixel image by the processor.

In order to detect complete ground region 108, the image intensity is divided into 16 bins by the processor. Traverse from bottommost pixel up to half of the height of the image. Those pixels which are marked as 'X' are considered as seed pixel. Choose the seed pixel, check the neighboring pixels and add them to the ground region if they are similar to the seed by computing Eulidean Distance (D) by the processor. Repeat this process for each of the newly added pixels; stop if no more pixels can be added. Newly added pixels are also now marked as 'X' by the processor. This method is based on the assumption that the roads have relatively constant temperature thus produces no edges in an edge detected image.

In the second step of the proposed method, the processor eliminates the non-ground objects based on their distance to ground. In order to eliminate the non-ground objects, the processor executes the following steps:

Initially, threshold the original gray level image 110 using Otsu algorithm. In the thresholded binary image, eliminates the pixels which are marked as 'X'. Then executes connected component analysis on binary image. Let consider 'Lr', 'Hr', 'Lc', 'Hc' be the lower most row, higher most row, left most column, right most column which constitutes the boundary box of a component. Then computes mean ($\mu$) and standard deviation ($\sigma$) on 'Hr' of all the components. Any components whose 'Hr' is less than ($\mu+\sigma$) 112 are deleted by the processor.

After the performance of the above mentioned steps there would be many non-ROIs which are bright stripe objects 114 such as a metallic sign boards, light sign board, traffic signs, headlight, an electric pole, and the poles of a guardrail. These objects have regular shapes.

In the third step of the proposed method, the processor filters the non-ROI objects based on the shape of such objects by computing the signal to noise ratio (SNR) for each of such non-ROI objects. In order to detect these regular shapes, the processor executes the following steps:

For each component, finds the exterior boundary. A boundary pixel is a pixel whose value is '1' and any one of the 8 neighbors whose pixel value is '0', then the processor computes centroid ($x_c, y_c$) for a blob. Then computes distance (r(t)) from centroid of the blob to shape contour.

$$r(n)=\sqrt{(x_i-x_c)^2+(y_i-y_c)^2}$$

Then computes N point DFT R(f) on r(n). Then searches for the local maxima of amplitudes of frequency contents. If local maximas occur periodically computation of such period is done. It is observed that objects which are regular in shape will have periodic local maximas and objects which are irregular in shape have no periodic local maximas. Then the processor computes replicated version of R(f)

$$\tilde{R}(f) = \begin{cases} R(f) & \forall f = M*L \\ 0 & \text{otherwise} \end{cases}$$

Where M is the periodicity and L is length/total number of samples in certain time In next step, computes N point IDFT $\tilde{R}(f)$ on $\tilde{r}(n)$ and then computes error signal, $e(n)=r(n)-\tilde{r}(n)$. Then the processor compute a signal to noise ratio (SNR), $$SNR=10 \log(S_y/S_e)$$

Where $S_y(n)=\Sigma(\tilde{r}[n])^2$ and $S_e(n)=\Sigma(e[n])^2$

SNR will be a very high for a regular shape object whereas for irregular shaped objects SNR will be less. In this way street light, car head light, pillars, lamp post are easily eliminated.

In the fourth step of the proposed method, the processor eliminates the non-vertical objects 116 by computing inertial moment relative to x and y axis with respect to the centre of mass of such non-vertical objects. In the gray level thresholded binary image, still there would be components which are aligned more horizontally rather than vertically. Pedestrian's objects are usually vertical in nature. In order to detect vertical elongated objects 118, the normalized central moments are used by the processor.

$$M_{XY} = \frac{1}{\text{Area}}\sum\sum(x-x_c)^x(y-y_c)^y I(x,y)$$

$$M_x = M_{2,0} = \frac{1}{\text{Area}}\sum\sum(x-x_c)^2 I(x,y)$$

$$M_y = M_{0,2} = \frac{1}{\text{Area}}\sum\sum(y-y_c)^2 I(x,y)$$

Where $M_x$, is the inertial moment, relative to X axis, in respect to the center of mass.

Where $M_y$, is the inertial moment, relative to Y axis, in respect to the center of mass.

Where $M_{xy}$, is the inertial moment, relative to both X and Y axis, in respect to the center of mass.

Since pedestrians are more vertical in nature $M_y > M_x$.

If $$\frac{M_y}{M_x} > th,$$

then object is vertical elongated otherwise it is horizontally elongated which will be deleted by the processor. In one exemplary embodiment of the invention, the estimated threshold was around 3.2.

In the fifth step of the proposed method, the processor classifies the pedestrians in the analyzed frame of the image based their shape. Once the objects basic structure and a qualitative hint about pedestrians have been obtained, a more accurate control is necessary. For classification, pedestrian shape is used as a cue.

In order to classify the pedestrians in the analyzed frame of the image, the processor executes the following steps: For each ROI, the processor finds the exterior boundary. A boundary pixel is a pixel whose value is '1' and any one of the 8 neighbors whose pixel value is '0'. Initially, computes centroid ($x_c, y_c$) for a blob. Represent the boundary as a complex co-ordinate function $Z(n)=[x(n)-x_c]+i[y(n)-y_c]$, This shift makes the shape representation invariant to translation. Objects shape and model shape can have different sizes. Consequently, the number of data points of the object and model representations will also be different. To avoid this problem, the shape boundary of objects and models must be sampled to have the same number of data points.

a) Assuming K is the total number of candidate points to be sampled along the shape boundary. The equal angle sampling selects candidate points spaced at equal angle $\theta=2\Pi/K$ b) Fourier descriptor (FD) is obtained by computing 32 point FFT on complex co-ordinate function $$a(u) = \sum_{k=0}^{K-1} Z(k)\exp(-j2\prod uk/K).$$

c) Rotation invariant of the FDs is achieved by ignoring the phase information and by taking only the magnitude values of the FDs.

d) Scale invariance is then obtained by dividing the magnitude values of the first half of FDs by the DC component.

$$f = \frac{|FD1|}{|FD0|}, \frac{|FD2|}{|FD0|}, \ldots \frac{|FD_{N/2}|}{|FD0|}.$$

e) Now for a model shape indexed by FD feature $f=[f_m^1, f_m^2, \ldots f_m^N]$ and a data shape indexed by FD feature $f=[f_d^1, f_d^2, \ldots f_d^N]$, since both features are normalized as to translation, rotation and scale, the Euclidean distance between the two feature vectors can be used as the similarity measurement.

$$d = \left(\sum_{i=0}^{N} |f_m^i - f_d^i|^2\right)^{1/2}$$

Where $N_c$ is the truncated number of harmonics needed to index the shape.

$$\text{Pedestrian} = \begin{cases} 1 & d < \text{threshold} \\ 0 & d > \text{threshold} \end{cases}.$$

Finally, pedestrians are classified based on the above comparison in the image.

In the final step of the proposed method, the processor tracks 120 the movement of the classified pedestrian using mean shift algorithm. In order to track the movement of the classified pedestrian, the processor executes the following steps:

After locating pedestrians in the current frame, from next frame onwards mean shift tracking is employed to track pedestrians. The mean shift tracking algorithm is an appearance based tracking method and it employs the mean shift iterations to find the target candidate that is the most similar to a given model in terms of intensity distribution, with the similarity of the two distributions being expressed by a metric based on the Bhattacharyya coefficient. The derivation of the Bhattacharyya coefficient from sample data involves the estimation of the target density q and the candidate density p, for which employs the histogram formulation.

First considering the centroid of pedestrian blob as centre x0, the target model histogram is calculated by considering the feature space.

Compute 32 bin histogram $\hat{q}$ on edge based thresholded image.

Target model: $\hat{q}=\{\hat{q}_u\}$ u=1, 2, 3, ... 32, $\Sigma\hat{q}_u=1$

From next frame onwards, centre of the target is initialized at its previous location (y0) and target candidate histogram is calculated by considering the same feature space.

Update 32 bin histogram $\hat{p}$ on edge based thresholded image.

Now the distance between target model and target candidate histogram is calculated, $d(y)=\sqrt{1-\rho[p(y),\hat{q}]}$, where $\rho[.]$ is the bhattacharya coefficient between p and q. Now the displacement of the target centre is calculated by the weighted mean.

$$y_1 = \frac{\sum_{i=1}^{n} x_i w_i}{\sum_{i=1}^{n} w_i}$$

where $$w_i = \sum_{u=1}^{m} \sqrt{\frac{q_u}{p_u(y_0)}}$$

Once the new location of target is found, the processor executes the following steps:

a. Computes target candidate histogram at new location with the same feature space involving histogram equalized image range and bottom hat transformed image.
b. Computes $\rho[\hat{p}(y_1),\hat{q}]$
c. While $\rho[\hat{p}(y_1),\hat{q}]<\rho[\hat{p}(y_0),\hat{q}]$
   do $y_1 \leftarrow (y_0+y_1)/2$
   evaluate $\rho[\hat{p}(y_1),\hat{q}]$
d. If $\|y_1-y_0\|<\epsilon$, stop.
e. Otherwise set $y_0 \leftarrow y_1$ and derive weights, then new location and go to step 1 by the processor.

The above said method further comprises the step of warning the driver for avoiding collision characterized by use of the tracking data of the pedestrian, wherein the alert means is used for warning the driver, wherein the said alert means can be audio and audio visual means including but not limited to an alarm, a voice based caution, or an Indicator.

The preceding description has been presented with reference to various embodiments of the invention. Persons skilled in the art and technology to which this invention pertains will appreciate that alterations and changes in the described process and methods of operation can be practiced without meaningfully departing from the principle, spirit and scope of this invention.

ADVANTAGES OF THE INVENTION

A system and method as proposed in the present invention has the following advantages:

1. The present invention provides a system and method for detecting, classifying and tracking the pedestrian present in front of the vehicle while driving for avoiding collisions which is easy to install and execute.
2. The system of the present invention also provides a method for detecting, classifying and tracking the pedestrian present in front of the vehicle while driving for avoiding collision having a reasonably high accuracy as compared to the existing conventional systems.
3. The present invention also provides a system and method for detecting, classifying and tracking the pedestrian present in front of the vehicle while driving for avoiding collision which is cost effective as compared to the conventional systems.

We claim:

1. A method for detecting, classifying and tracking a pedestrian present in front of a vehicle by using images captured by a near infrared (IR) camera disposed on the vehicle, the method comprising processor implemented steps of:
    a) detecting a road to focus attention for filtering region of interest (ROI) objects in the image by estimating a ground region characterized by identifying smooth regions connected to a bottom most part of the image;
    b) eliminating non-ground objects based on their distance to the ground;
    c) filtering non-ROI objects based on a shape of the objects by computing a signal to noise ratio (SNR) which is a measure of regularity of a component based on its periodicity of its contour for each of such non-ROI objects;
    d) eliminating non-vertical objects by computing inertial moment relative to x and y axis with respect to a centre of mass of the non-vertical objects;
    e) classifying the pedestrians in the image based on their shapes; and
    f) tracking a movement of the classified pedestrian using a mean shift algorithm.

2. The method of claim 1, further comprising a step for warning a driver of the vehicle for avoiding collision characterized by use of tracking data of the pedestrian.

3. The method of claim 1, wherein the near IR camera is disposed either on the dashboard or in front or inside or top of the vehicle.

4. The method of claim 1, wherein the ground plane is estimated by the processor implemented steps of:
    a) differentiating the captured IR image using sobel operator;
    b) applying otsu algorithm on the differentiated image to threshold the differentiated image;
    c) detecting the road by identifying a smooth region, wherein the region from bottom most pixel to 0-1 transition indicates smooth region, subsequently marking the smooth region value as 'X, and repeating the above said marking for each bottom most pixel image; and
    d) dividing the original image intensity into 16 bins, then traverse from bottom most pixel up to half of the height of the image, subsequently considering the marked pixels as seed pixel then choosing the seed pixel, subsequently checking neighboring pixels and adding them to the ground region if they are similar to the seed pixel by computing Euclidean Distance (D) between their intensities, then repeating the above said process for each of the newly added pixels, Stop the process if no more pixels can be added and finally marking the newly added pixels as 'X'.

5. The method of claim 4, wherein the non-ground objects are eliminated by the processor implemented steps of:
    a) applying otsu algorithm on an original gray level image to threshold the original gray level image;
    b) neglecting the marked pixels in the thresholded binary image;
    c) running the connected component analysis on the unmarked pixels in the thresholded binary image, wherein the lower most row, higher most row, left most column, right most column which constitutes the boundary box of a component of the image; and
    d) computing mean and standard deviation on the higher most row of all the components and subsequently deleting the components, if the value of the higher most row of the component is less than value of sum of mean and standard deviation.

6. The method of claim 1, wherein the signal to noise ratio (SNR) is computed by the processor implemented steps of:
    a) determining an exterior boundary for each component;
    b) computing centroid for a blob;
    c) computing distance from centroid of the blob to shape contour;
    d) computing N point DFT of the computed distance on the shape contour;
    e) searching local maxima of amplitudes of frequency contents and subsequently computing the period if one or more local maximas occurs periodically;
    f) computing replicated version of N point DFT of the computed distance;
    g) computing N point IDFT on computed distance on the shape contour;
    h) computing error signal; and
    i) finally computing signal to noise ratio (SNR) of the each component from the error signal.

7. The method of claim 1, wherein classifying the pedestrians is done by the processor implemented steps of:
    a) finding out an exterior boundary for each ROI;
    b) computing centroid for a blob;
    c) representing the exterior boundary as a complex co-ordinate function, wherein this shift makes the shape representation invariant to translation;
    d) sampling shape boundary of objects and models to have the same number of data points;
    e) comparing the data values of the shape boundary of objects and models; and
    f) classifying pedestrians based on the above comparison.

8. A system for detecting, classifying and tracking a pedestrian present in front of a vehicle by using a near infrared (IR) camera, the system comprises of:
    a) a near IR camera disposed on the vehicle for capturing an image; and
    b) a processor for analyzing the captured image in real-time for detecting, classifying and tracking the pedestrian present in front of the vehicle by:
        detecting a road to focus attention for filtering region of interest (ROI) objects in the said image by estimating a ground region characterized by identifying smooth regions connected to bottom most part of the image;
        eliminating non-ground objects based on their distance to the ground;
        filtering non-ROI objects based on a shape of such the objects by computing a signal to noise ratio (SNR) which is a measure of regularity of a component based on its periodicity of its contour for each of such non-ROI objects;
        eliminating non-vertical objects by computing inertial moment relative to x and y axis with respect to a centre of mass of such the non-vertical objects;
        classifying the pedestrians in the analyzed frame of the image based on their shapes; and
        tracking a movement of the classified pedestrian using mean shift algorithm.

9. The system of claim 8, further comprises an alert means comprising alarm, a voice based caution, or a visual indicator for warning a driver of the vehicle for avoiding collision characterized by use of tracking data of the pedestrian.

* * * * *